(12) United States Patent
Lim et al.

(10) Patent No.: US 8,463,280 B1
(45) Date of Patent: Jun. 11, 2013

(54) HETEROGENEOUS MOBILE NETWORKING

(76) Inventors: Kyutae Lim, Alpharetta, GA (US); Joy Laskar, Marietta, GA (US); Ara Chakrabarti, San Ramon, CA (US)

(*) Notice: Subject to any disclaimer, the term of this patent is extended or adjusted under 35 U.S.C. 154(b) by 42 days.

(21) Appl. No.: 12/712,777

(22) Filed: Feb. 25, 2010

Related U.S. Application Data

(60) Provisional application No. 61/208,577, filed on Feb. 25, 2009, provisional application No. 61/211,180, filed on Mar. 27, 2009, provisional application No. 61/166,830, filed on Apr. 6, 2009, provisional application No. 61/166,862, filed on Apr. 6, 2009.

(51) Int. Cl.
*G06F 15/16* (2006.01)

(52) U.S. Cl.
USPC .................................. 455/452.1; 455/419

(58) Field of Classification Search
USPC .................. 455/419, 452.1, 456.1, 456.5
See application file for complete search history.

(56) References Cited

U.S. PATENT DOCUMENTS

| | | | |
|---|---|---|---|
| 2007/0033645 A1* | 2/2007 | Jones | 726/12 |
| 2011/0003586 A1* | 1/2011 | Harrigan | 455/419 |

* cited by examiner

*Primary Examiner* — Sam Bhattacharya
(74) *Attorney, Agent, or Firm* — J. Bennett Mullinax, LLC

(57) ABSTRACT

A method and process for establishing a mapped network of access points for a user of a wireless device is provided. A unique and customized network is selected from cellular connections, private wireless connections, public wireless connections, and wireless card connections such that a unique and personalized control of wireless connectivity may be established. Greater wireless resources are thus made available and provide for greater connectivity and improved battery life for a user's device.

5 Claims, 10 Drawing Sheets

HETEROGENEOUS MOBILE NETWORKING

RELATED APPLICATIONS

This application claims the benefit of U.S. Provisional Application No. 61/208,577 filed on Feb. 25, 2009 entitled "Heterogeneous Mobile Networking" and which is incorporated herein by reference. The application further claims the benefit of U.S. Provisional Application No. 61/211,280 filed Mar. 27, 2009 entitled "Database Assisted-Wireless Network", and further claims the benefit of U.S. Provisional Application No. 61/166,830 filed on Apr. 6, 2009 entitled "Method of Optimum Wireless Network Selection", and further claims the benefit of U.S. Provisional Application No. 61/166,862 filed on Apr. 6, 2009 entitled "Data Structure for Optimum Wireless Network Selection. All of the above-referenced US provisional applications are incorporated herein by reference for all purposes.

FIELD OF THE INVENTION

This invention is directed towards a method and process for establishing a mapped network of access points for a user of a wireless device. By establishing a unique and customized network comprised of available cellular connections, private wireless connections, public wireless connections, and wireless card connections, a unique and personalized control of wireless connectivity may be established. The unique network allows for improved spectrum management of available wireless resources to ensure the highest available thru-put, greater connectivity, and longer battery life for the user's device.

BACKGROUND OF THE INVENTION

This invention relates to wireless networks which are used to communicate with a wireless device such as a portable notebook computer, a handheld wireless device, or multipurpose cell phone. Heretofore, users of a wireless device could enjoy mobile access only through a cell phone carrier which provides for seamless transfer from one access point of the proprietary cell phone network to the next best available access point when the user of the wireless device is mobile. However, maintaining dedicated use and connection to a proprietary provider of wireless service such as Verizon®, Alltel®, Sprint®, and AT&T Wireless® is often the default connection choice for a wireless device. The user of a wireless device would have to manually select and configure the wireless device for communication using other access points such as a public or private wireless network. Heretofore, the ability to seamlessly transfer from one wireless access point to another wireless access point of different providers or using different forms of wireless connectivity required manual reconfiguration of the wireless device.

Additionally, a wireless device typically is dedicated to one network for wireless communication at a time irrespective of the bandwidth demands of the particular wireless application. Accordingly, a wireless connection may be maintained despite the availability of a better wireless choice for the communication demands such as the content (security issues) or bandwidth demand.

Accordingly, there is need for room and improvement in the art directed to ways to enhance communication protocols between a wireless device and multiple available access points for communication with the particular wireless device.

SUMMARY OF THE INVENTION

It is one aspect of at least one of the present embodiments to provide a communication protocol including: providing a user device selected from a group consisting of a cellular telephone, a wireless handheld device, and a laptop computer; establishing a database of geographic locations of the user device, the geographic location further including identifying available wireless resources available to the wireless device; establishing a behavioral pattern of the user device based upon at least of one of a geographic location, a direction of travel, time of day, or bandwidth demand of the user device; using the collected information to predict user device needs to provide a default wireless connection of the user device at a given geographical location to maximize wireless resources and minimize cost of use of the user device; and, detecting transmitted data characteristics of the data being transmitted to or from the user device and altering the wireless connection resource based upon the characteristics of the data being transmitted.

It is a further aspect of at least one embodiment of the invention to create a database of wireless communication access points comprising the steps of: detecting a known wireless device geographic location from at least one of a GPS detector, a public wi-fi connection, a cellular telephone connection, or a proprietary wi-fi connection; recognizing a pattern of usage of the known wireless device based upon a repeated pattern observed in establishing the database; selecting for the known wireless device while within a given geographic location the most cost effective wireless communication protocol; and, monitoring the wireless communication content for at least one of bandwidth usage or proprietary transmission and seamlessly connecting the known wireless device to an alternative wireless connection mode in view of the transmission characteristics.

It is a further aspect of at least one embodiment of the invention to create a database comprising the additional step of: detecting movement of the known wireless device from one geographic location to another; predicting, based upon the pattern of usage, a predicted path of the wireless device; seamlessly transferring the wireless device from one connection source to a second connection source based upon an evaluation of first a geographic location of the wireless device and secondly an analysis of at least one of a bandwidth usage and a wireless content of information being transmitted or received by the known wireless device, the step further including selecting the most cost efficient communication protocol available for the known wireless device based on sent bandwidth usage and sent information content.

It is a further aspect of at least one embodiment of the invention to provide a process of selecting a wireless communication choice for a wireless device comprising the steps of: identifying the wireless device; establishing a geographic location for the wireless device; detecting a desired access point for the wireless device at a given location; connecting the wireless device to the access point; monitoring a content of a wireless transmission between the access point and the wireless device and changing the access point based upon a content of the wireless transmission; and, periodically monitoring conditions of a geographic location, available access points, and wireless transmission content between the access point and the wireless device to vary the selected access point to provide an optimal connection.

It is a further aspect of at least one embodiment of the invention to provide a process wherein a wireless connection is determined by an analysis of at least one of a transmission content between a wireless device and the access point and bandwidth usage of the transmission between the wireless device and the access point.

These and other features, aspects, and advantages of the present invention will become better understood with reference to the following description and appended claims.

BRIEF DESCRIPTION OF THE DRAWINGS

A fully enabling disclosure of the present invention, including the best mode thereof to one of ordinary skill in the art, is set forth more particularly in the remainder of the specification, including reference to the accompanying drawings.

DESCRIPTION OF THE PREFERRED EMBODIMENT

Reference will now be made in detail to the embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention cover such modifications and variations as come within the scope of the appended claims and their equivalents. Other objects, features, and aspects of the present invention are disclosed in the following detailed description. It is to be understood by one of ordinary skill in the art that the present discussion is a description of exemplary embodiments only and is not intended as limiting the broader aspects of the present invention, which broader aspects are embodied in the exemplary constructions.

In describing the various figures herein, the same reference numbers are used throughout to describe the same material, apparatus, or process pathway. To avoid redundancy, detailed descriptions of much of the apparatus once described in relation to a figure is not repeated in the descriptions of subsequent figures, although such apparatus or process is labeled with the same reference numbers.

The present invention is directed towards an ability to have a user's wireless device having proprietary software which allows the user's device to monitor applications for bandwidth demands, quality of service, and content of transmissions in order to thereafter connect to the best available wireless resource based upon a combination of the wireless device's location and the quality/quantity of information being transmitted. The selection of the best wireless connection is made by considering the security needs for the particular application, bandwidth requirements, application being used by the wireless device, and the strength of available wireless access points.

Figure 1:
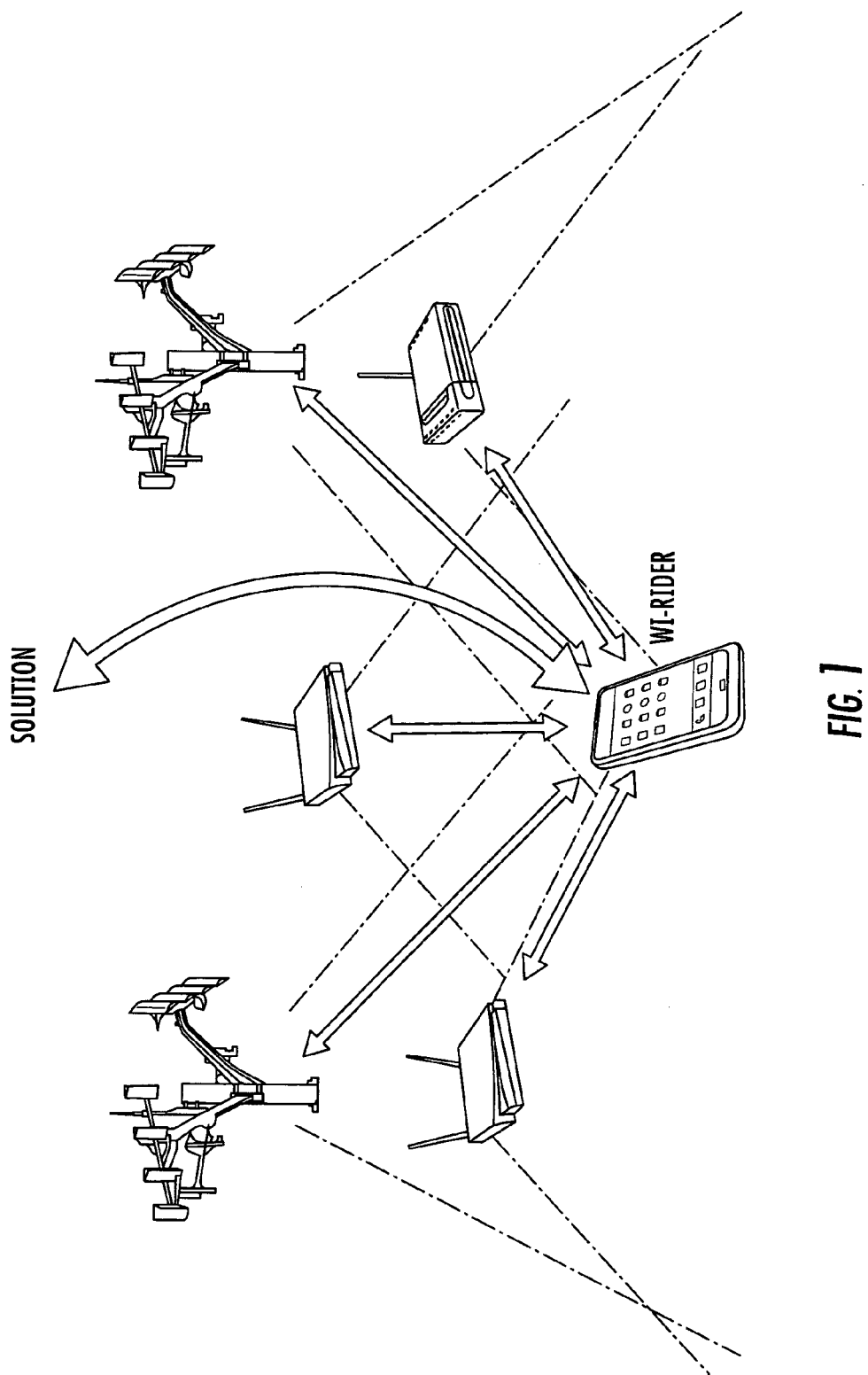
FIG. 1 is a schematic diagram illustrating the ability of a single wireless device to communicate with multiple access points ranging from cell phone protocols to proprietary wi-fi hot spots to public wi-fi hot spots.

A key feature of the wireless management protocol is the ability to create a customized database of access points (AP) which is created for a new user and continuously updated based upon inputs and data exchanges between the user device and available access points. As seen in reference to FIG. 1, a user device 10 may have multiple options at any given location for connecting with a variety of different carriers and access points including cell phone and both proprietary and open wi-fi hot spots. The data management utilizes a personal radio resource manager database (PRRM) which facilitates the creation and customization of a unique user AP zone (APZ).

Figure 2:
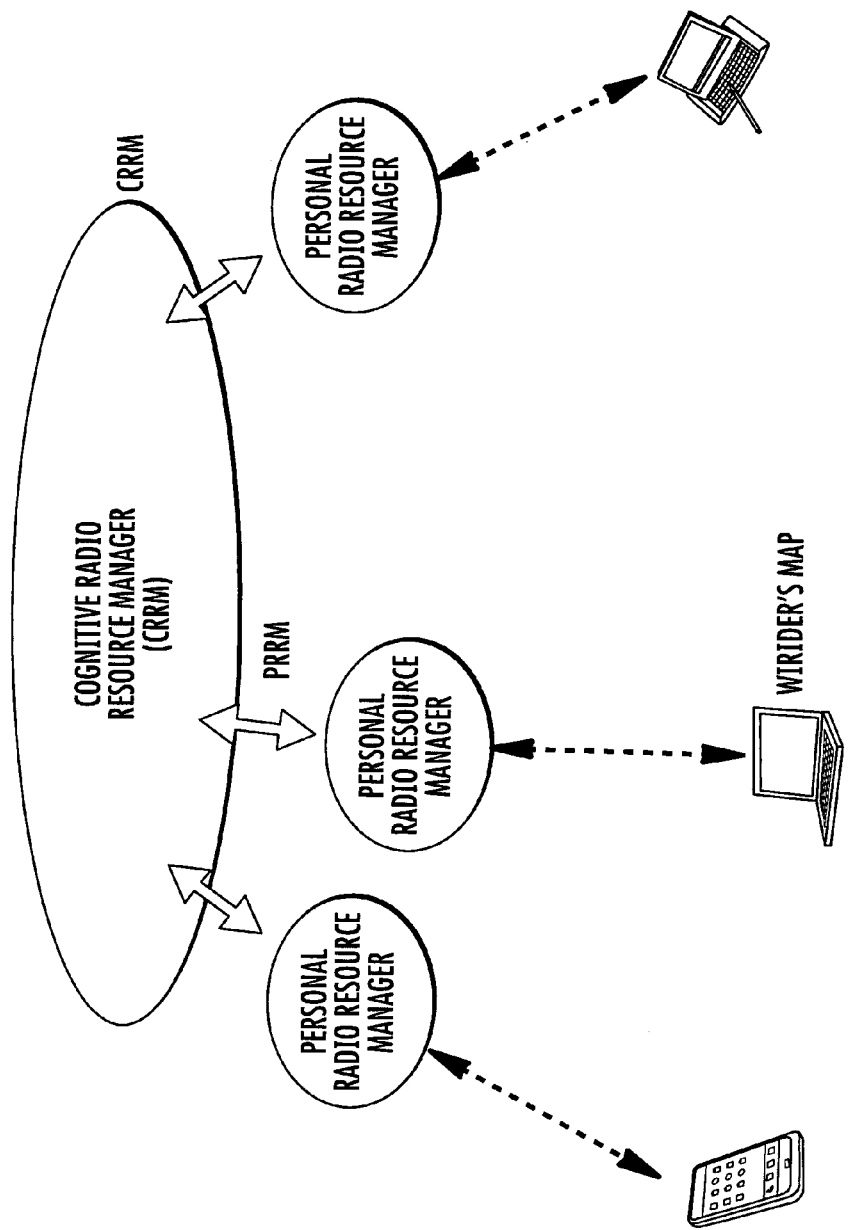
FIG. 2 is a schematic diagram illustrating interactions between a cognitive radio resource manager database and the personal radio resource manager database as seen in reference to information sent and received from an individual wireless device.

As seen in reference to FIG. 2, a variety of user devices 10 are able to communicate with the PRRM database. Through interaction between the wireless device 10 and the PRRM, the PRRM database will record and manage the wireless usage pattern of the device 10. As described below, over time, the PRRM will develop a unique map of access points available for the user device 10.

Summary Procedure of APZ creation
  i. The PRRM downloads the list of APs from a cognitive radio resource manager (CCRM) around the current location of user devices.
  ii. The PRRM removes APs, which user devices can not login, from the list
  iii. The PRRM creates a customized APZ by aggregating the near-by APs without user's actions.
    a. The PRRM assigns a pre-defined value to the coverage of all APs in the list. The coverage value of an AP is updated by referring to the measured signal strength of the AP, which is given by user devices. The more measurements are collected, the better the accuracy of the coverage value becomes.
    b. By linking all coverage areas of the APs in the list, the APZ now has its own service coverage shaping all areas of the APs in the list.
  iv. If the PRRM recognizes that the APZ location is inside a building, the PRRM maps the building contour to the APZ coverage area.
  v. User devices can use the APZ information for a handover decision from a wi-fi network to a cellular network or versus.
  vi. The PRRM updates continuously the APZ information by referring to both inputs from user devices and data from the CRRM The PRRM uses information collected from the wireless device to establish a list of all available APs where a user or the user device can log in for internet or wireless access. The APZ is created by the PRRM database initially establishing a list of APs from a master database of a cognitive radio resource manager (CRRM) which may be a regional, national, or global database of APs known to exist around the current location of an individual user device. The PRRM automatically removes unavailable APs which the individual user device cannot access. The PRRM then creates a customized APZ by aggregating available APs in proximity to the user device. In the process of establishing available APs, the PRRM will assign a pre-defined value to the coverage of available APs. The value of an AP may be constantly updated by referring to the signal strength of the AP which is detected by the user device. Over time, as more measurements are collected, the accuracy of the APZ is increased. The PRRM thereby establishes a linked coverage zone having the geographical boundaries which are unique to an individual user's pattern of geographic locations as well as usage demands based upon location, time of day, and transmission content.

AP Socialization Overview

In one APZ, every AP is logically or geographically connected with one or multiple neighbor APs (nAPs), which are all members of the AP list of the APZ. The number of nAPs is limited to a certain number, which is designated to simplify the APZ management.

By using the APZ, user devices can save power and time required for sensing whole potential spectrums to find a new AP. Instead, user devices only sense beacon signals of nAPs belonging to the same APZ.

If the PRRM knows the locations of all APs in the APZ, the PRRM can choose APs, which are nearby to the AP, as the nAPs of the AP. The nAP selection for all member APs is conducted in the same way. Otherwise, the PRRM makes logical connections between the AP and nAPs when the PRRM does not know the exact locations of APs like indoor environment. In this case, the PRRM needs the help of user devices (UDs) to find neighbor APs first.

The procedure of neighbor APs search and logical connection setup is as follows:
i. When the PRRM recognizes that some UDs are near to the coverage area of the APZ, which location information is classified as inaccurate, the PRRM can make the request to UDs to measure and report signal strengths of neighbor APs.
ii. When requested, the UDs measure signal strengths of neighbor APs and sends report messages that contain the sorted list of APs in the signal strength descending order.
iii. During a specific period of time, the PRRM collects the signal strength measurement report messages and then, selects two APs that their signal strengths are the most highest and the next one. Two APs are logically linked as the neighbors.
iv. UDs are expected continuously to transmit measured signal strengths of neighbor APs, and the PRRM can socialize-make a logical connection between-two APs by repeating the step 4). In the end, as UDs moves around the APZ service coverage, every AP member in the AP list of the APZ is connected with one or multiple neighbor APs as the neighbors.
v. When the PRRM knows the exact locations of the APs, all logical connections between APs are converted to the geological connections like a normal APZ.

Live-Zone (LZ)

A Living-Zone (LZ) over APZ is the abstract data set that collects and analyzes user's lifestyle by referring to their APZs. In a case of either uncertainty of user's location or fast network selection required, the PRRM can make a precise decision of a proper access network selection by referring to the LZ.

According to the geolocation, the data in LZ can be classified to one of followings:
LZc (Core Living Zone): The areas where users regularly spend their times during a day like a house and an office.
LZs (Sub Living Zone): The areas where users irregularly visit like a hospital, shopping malls and gyms.
LZn (Newly Found Living Zone): The areas where users have never visited before or had visited a long time ago like an airport and places of the like.
Path: The path between LZs, and there are multiple paths between LZs.

Wireless Network Selection Algorithm

Every UD runs the algorithm that uses location information, radio resource information, and the repository of user's network usage to find the most proper wireless access network while UD is moving to another area.

1. Multiple Coverage for AP

To help an efficient and smooth handover, the APZ adopts multi coverage concept. Every AP has two coverage instants, one covers 99% areas of AP transmission coverage, called confidence area, and the other covers 50% areas of AP transmission coverage, called transition area. Two instants are updated continuously with inputs from user devices.

The APZ also has two coverage instants like the AP since the APZ consists of APs. If a UD is around an APZ transition area, the UD can prepare hand-over through establishing the connection to a nAP in advance where UD predicts to move toward.

Figure 3:
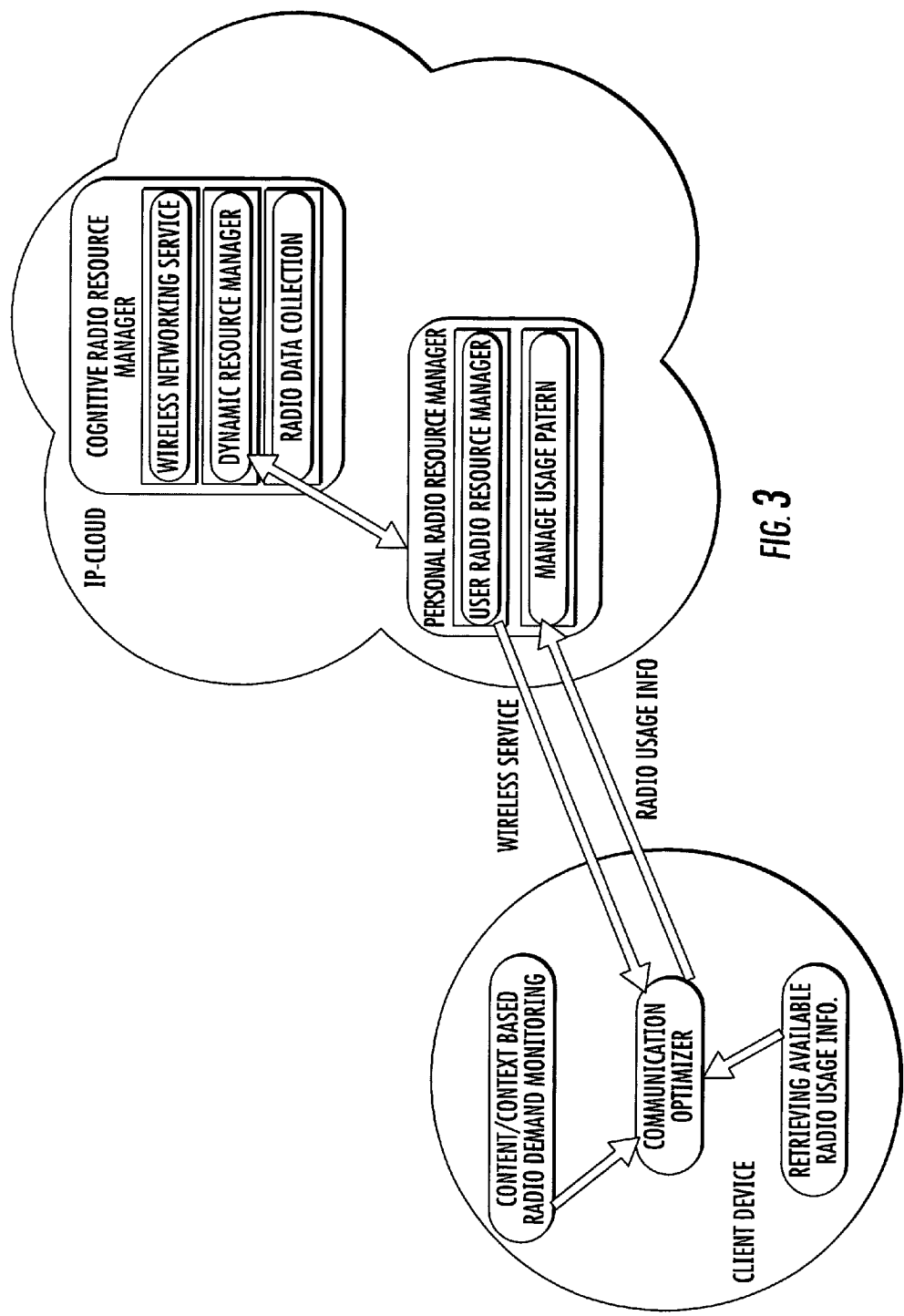
FIG. 3 is a schematic diagram illustrating further interactions between the two databases and the wireless client device.

Based upon location within the APZ as well as bandwidth resource requirements, the PRRM can coordinate a transfer from one AP to an adjacent or alternative AP. For instance, as seen in reference to FIG. 3, if a stationary user device changes the bandwidth quality from a large database transfer that is utilizing an open wireless AP, to content which is transmitting potentially sensitive financial information or is accessing an encrypted database, the PRRM can seamlessly transfer the user device from the open wireless network to a more secure cellular connection. Once the secured transmission is completed, the PRRM, in coordination with the wireless device detects usage and bandwidth characteristics that may be better served by an open wireless AP, the PRRM can again seamlessly transfer the connection from a secure connection such as a cellular phone connection to a wireless AP.

Figure 4:
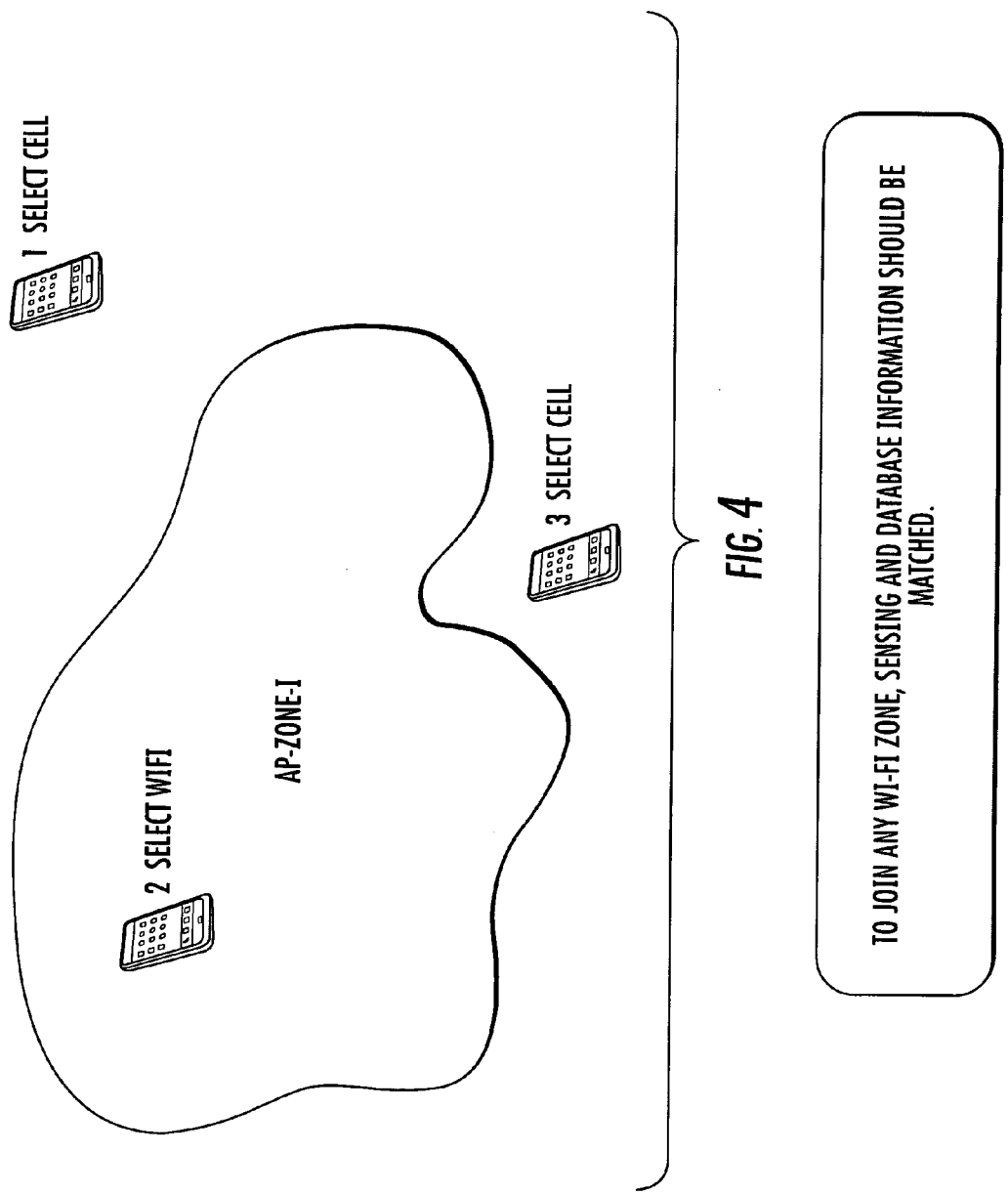
FIG. 4 is a schematic diagram indicating scenarios of selecting an appropriate communication protocol depending upon the location of a wireless device.

As seen in reference to FIG. 4, the software and software containing algorithms on the user device are able to detect locations, as best described below, and make an appropriate connection selection based on geographic location and relative signal strength. In the schematic scenario 1 of FIG. 4, if the user device detects it is not in an APZ, a cell connection is utilized. In Example 2 of FIG. 4, the user device detects it is in a known APZ and will connect to an available wi-fi device assuming the content of the transmission does not necessitate the optional connection of a cell connection. In Example 3 of FIG. 4, it is recognized that a user device may be in an APZ but for transmit reasons is unable to obtain or detect adequate signal strength. In such cases, the wireless device will select the cell connection until such time as the known AP is again available for use by the wireless device.

By establishing an APZ, the user device utilizes less power and spends less time scanning potential bandwidth spectrums to identify new APs. Through the PRRM database, the user device can save power usage and time by sensing only peaking signals of APs in the unique APZ for the user. For instance, a handheld wireless device in an AP zone may default to an available wireless connection for the purposes of accessing the internet. However, if a user device requires a connection to a proprietary cell connection for purposes of sending or receiving a text or making or receiving a cell phone call, the seamless switching of connections will occur.

As part of the establishment of the APZ, the PRRM may request that the user device measure signal strengths of available APs such that the APs' may be ranked in descending order based upon signal strength. For efficiency, the PRRM maintains as part of the database management the best two APs based upon signal strength. The two APs are logically linked as neighbors and by identifying a neighboring AP, the PRRM can establish a logical "next connection" based upon movement of the user device within the APZ.

Every UD runs the algorithm that uses location information, radio resource information, and the repository of user's network usage to find the most proper wireless access network while UD is moving to another area.

Multiple Coverage for AP

To help an efficient and smooth handover, the APZ adopts multi coverage concept. Every AP has two coverage instants, one covers 99% areas of AP transmission coverage, called confidence area, and the other covers 50% areas of AP transmission coverage, called transition area. Two instants are updated continuously with inputs from user devices.

The APZ also has two coverage instants like the AP since the APZ consists of APs. If a UD is around an APZ transition area, the UD can prepare hand-over through establishing the connection to a nAP in advance where UD predicts to move toward.

The PRRM helps establish a number of zones where the user device has repeated patterns of activity. For instance, areas where a user regularly spends large amounts of time such as their residence or an office work environment, an APZ is created which accurately maps activity in the stated locations. For instance, in a residential environment there may be multiple access points including wireless network and cellular connectivity for which the PRRM can manage connectivity to establish the best match between the user device demands and the available spectrum resources.

Additional sub-zones may be established where there is consistent but irregular activity such as a coffee shop, gym, or a location such as a client's place of business or a friend's residence. The PRRM can also establish recognized transportation paths between spatially separated APZs. For instance, a residential APZ and a work environment APZ would establish a pathway APZ based upon transportation habits and patterns. Where connection is established in a path zone, the practical requirements of transportation speed and network availability would limit the amount of searching and switching needed in that a more robust connection such as a cellular connection is likely to be the best choice.

Through the PRRM database, additional zones can be established and created based upon patterns. For instance, if the user and user device travel to another location on a regular basis, the PRRM will recognize the location of the user device and establish the appropriate mapping and network of available APs. The nature of the PRRM database management is such that upon repeat visits to a given location, updating of available APs and the strength of APs is seamlessly integrated into provide an enhanced APZ for the location.

The software utilized by the wireless device uses an algorithm that finds the best available wireless access network based upon geographical location, radio resource information, and the quality/quantity of content to find the best wireless access network. The algorithm further utilizes the information to help establish the best APs to connect to as the user device is moving from AP to another AP.

Procedure of Wireless Network Selection

Network Joining

To join any wi-fi Zone, sensing results and network information from the database should be matched. Any events related to the network connection changes are recorded to the PRRM. If the sensing result is not matched with network information given by the database, then the PRRM reports this to the CRRM i. When a UD recognizes that he is not in any APZ, the UD joins to a cellular network.

ii. When a UD recognizes that he is in any APZ, and when the UD can detect (a) beacon signals of (a) APs in the APZ If the UD cannot detect any beacon signals, the UD joins to a cellular network.

If the UD is moving faster than a certain speed, the UD is forced to use a cellular network instead of Wi-Fi networks.

Cellular to APZ Switching i. A UD keeps tracking the location and compares with downloaded user's radio resource information.

ii. If a geolocation tells that the UD is in an APZ, then the UD runs spectrum sensing to detect any beacon signals from the APs of the APZ.

If the UD finds any beacon signal, then the UD joins to the APZ.

Otherwise, the UD keeps the cellular connection.

APZ to Cellular Switching i. A UD keeps tracking user location and monitoring signal strength measurements.

ii. If a signal level is lower than a certain threshold or a geolocation indicates that the UD should prepare the transition:

First, the UD predicts the next movements based on a move vector like the repository of UD movements.

The UD secures all possible wireless connections available for the movements.

iii. The UD keeps running step 1) until the UD meets one of following cases:

If the geolocation indicates that the UD is in another APZ and can detect beacon signals from APs belonging to another APZ, the UD switches to the APZ.

If the geolocation indicates that the UD is in the cellular service area, the UD switches to the cellular network.

If the geolocation indicates that the UD is in confidence area, and the signal strength of a current serving AP is still greater than a certain threshold, the UD returns to a normal mode after stopping the procedure of the APZ to cellular switching procedure.

Figure 5:
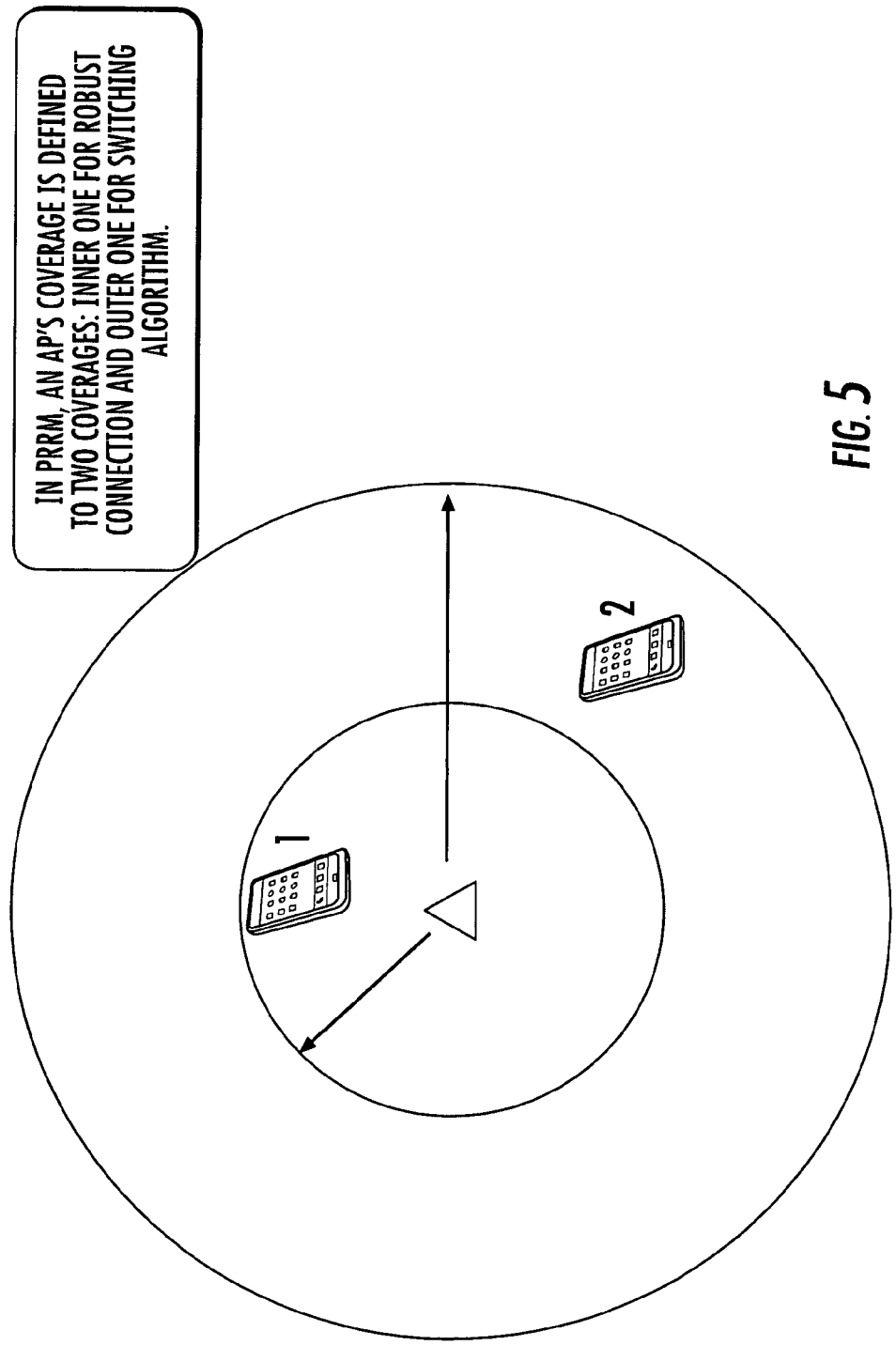
FIG. 5 is a schematic diagram showing relative signal strength as a means of preparing for switching from one AP site to another AP site.
Figure 7:
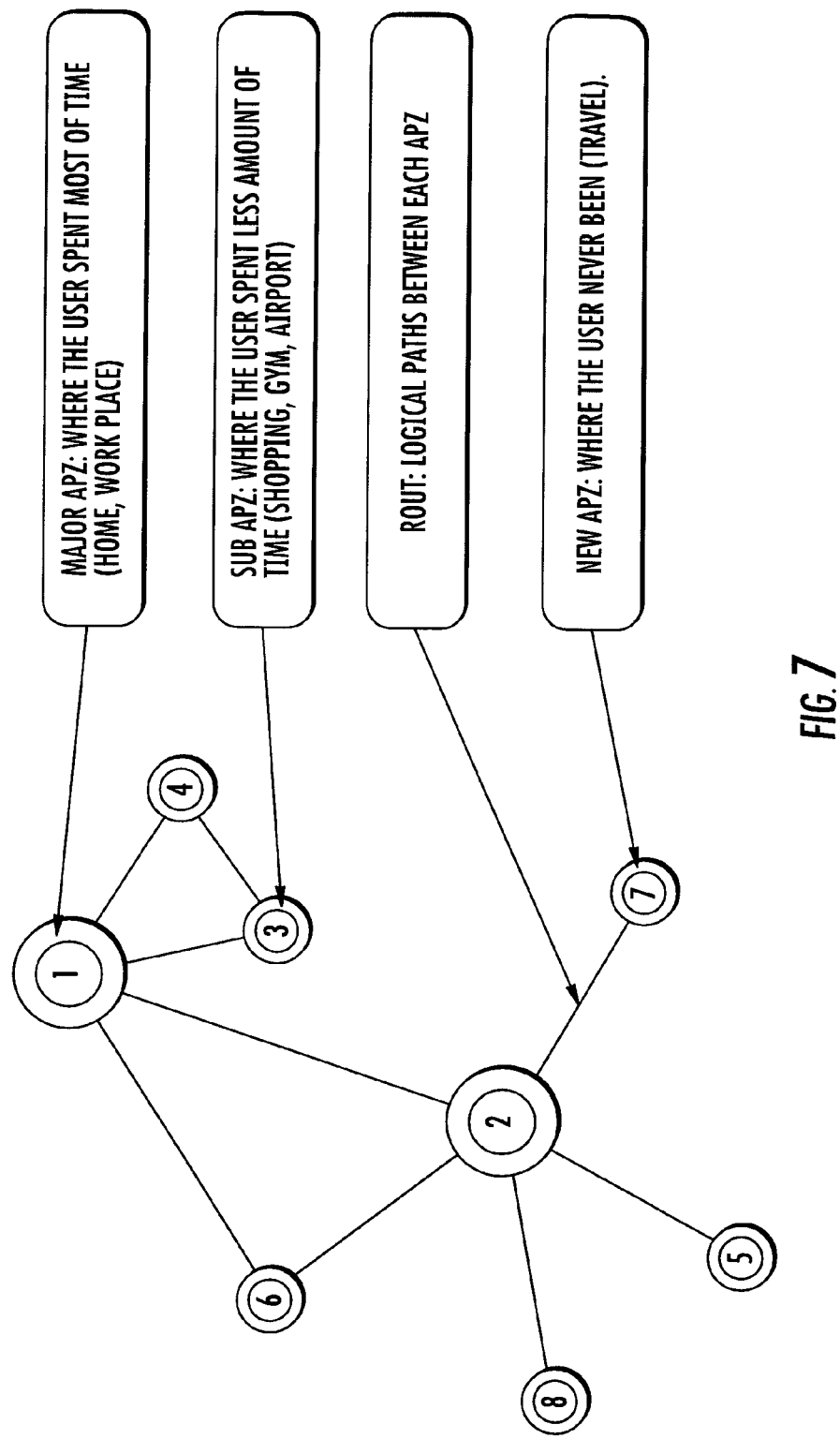
FIG. 7 is a schematic diagram illustrating various AP zones that may be established between the wireless device and the PRRM database.

The algorithm helps to provide for an efficient and smooth handover based upon a multi-coverage concept. As set forth in FIG. 5, within a high signal strength of an AP, termed a "confidence area", connectivity to that access point is maintained. As movement of the user device is detected based upon various geolocation protocols including signal strength, analysis of AP, and/or other geolocation methodologies, the PRRM will sense the user device entering a transition area where the confidence area falls below a desired threshold. Accordingly, the PRRM will begin identifying an adjacent or neighboring APZ for transition of the user device from one AP to a neighboring AP as seen in reference to FIG. 7. When the user device is in a well mapped APZ, the PRRM database allows for a reliable prediction of the adjacent AP based upon prior patterns of usage of the user device within the APZ.

AP-AP in APZ Switching

The UD can switch to a new AP, which is the member of the same APZ, if the new one is regarded as the better AP to provide improved communication. The decision can be relied on the status of channel environment, traffic load and receiving power of a current associated AP and candidate APs. The UD chooses target APs among nAPs in the APZ to be monitored instead of scanning entire wi-fi channels The PRRM coordinates with the user device to provide for a seamless transition from one AP to another AP based upon availability of communication networks and content needs of the user device. For instance, if a user device is not within any recognized APZ, the user device is directed to join a cellular network. Likewise, if the user device is in motion indicative of rapid travel by car or other vehicle, or the user device is within a recognized travel path between APZs, then the PRRM maintains a cellular connection with the user device. When the user device detects that it is in an APZ, then the user device runs a spectrum sensing software to detect beacon signals from available APs within the APZ. If the user device finds the appropriate beacon signal, then the user device will be joined to the APZ. If no beacon signal is found or if the nature of the user device transmission so requires, a cellular connection with the user device is maintained.

Figure 6:
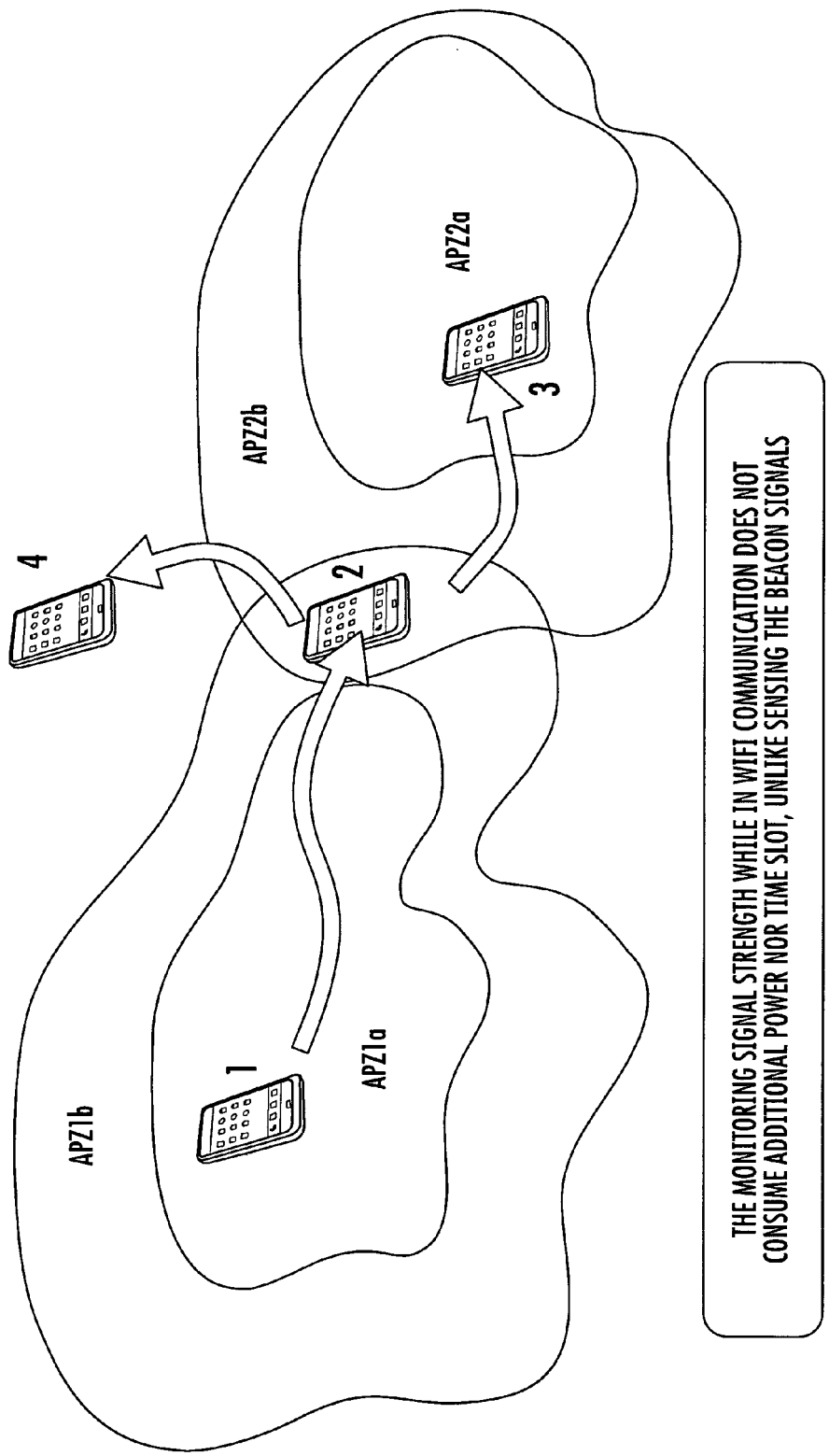
FIG. 6 is a schematic diagram illustrating additional embodiments of a switching algorithm for detecting proper connection of a signal to a wireless device.

Within a given APZ, the user device will switch to a new AP if the new AP provides improved communication. As seen in reference to FIGS. 5 and 6, the decision to switch to a different AP within the APZ is influenced by the traffic load, the channel environment, and relative signal strength of the currently associated AP and the candidate AP. Since the user device is targeting known APs within the APZ, the user device does not need to scan the entire available spectrum of potential wi-fi channels.

Figure 8:
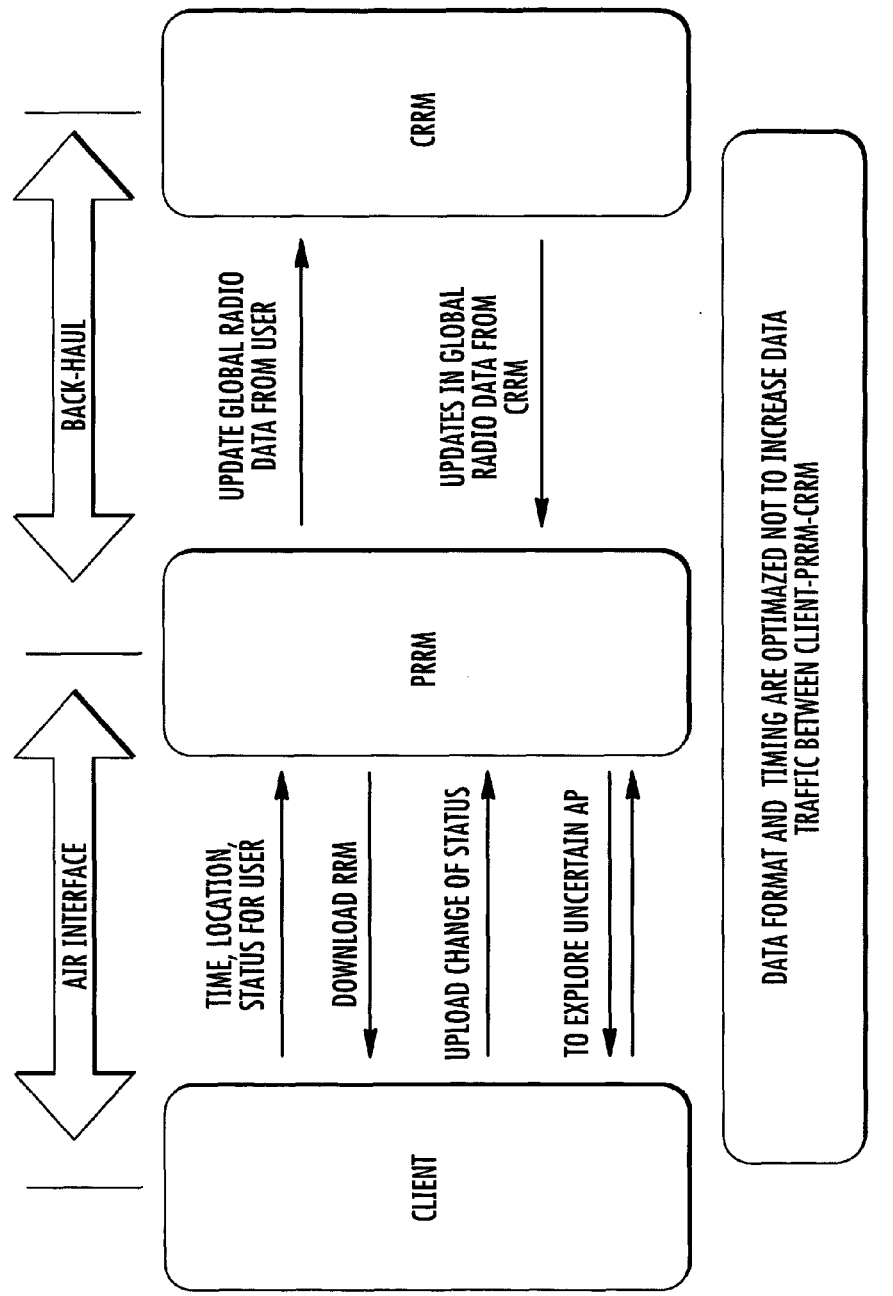
FIG. 8 is a schematic diagram indicating the flow of information relative to an individual wireless device of a client, the PRRM database, and the CRRM database.

An additional database utilized in the management of resource data includes a cognitive radio resource manager (CRRM) which may be a regional, national, or global database. The CRRM database collects global radio resource usage information and participates in a dual exchange of information with the PRRM. As seen in reference to FIG. 8, the interaction between the client device, containing the appropriate software, and the PRRM database is set forth. Additionally, FIG. 8 provides interaction between the PRRM and the CRRM, the PRRM acting as a buffer to shield transmittal of personal or identifiable information of the client to the PRRM.

Figure 9:
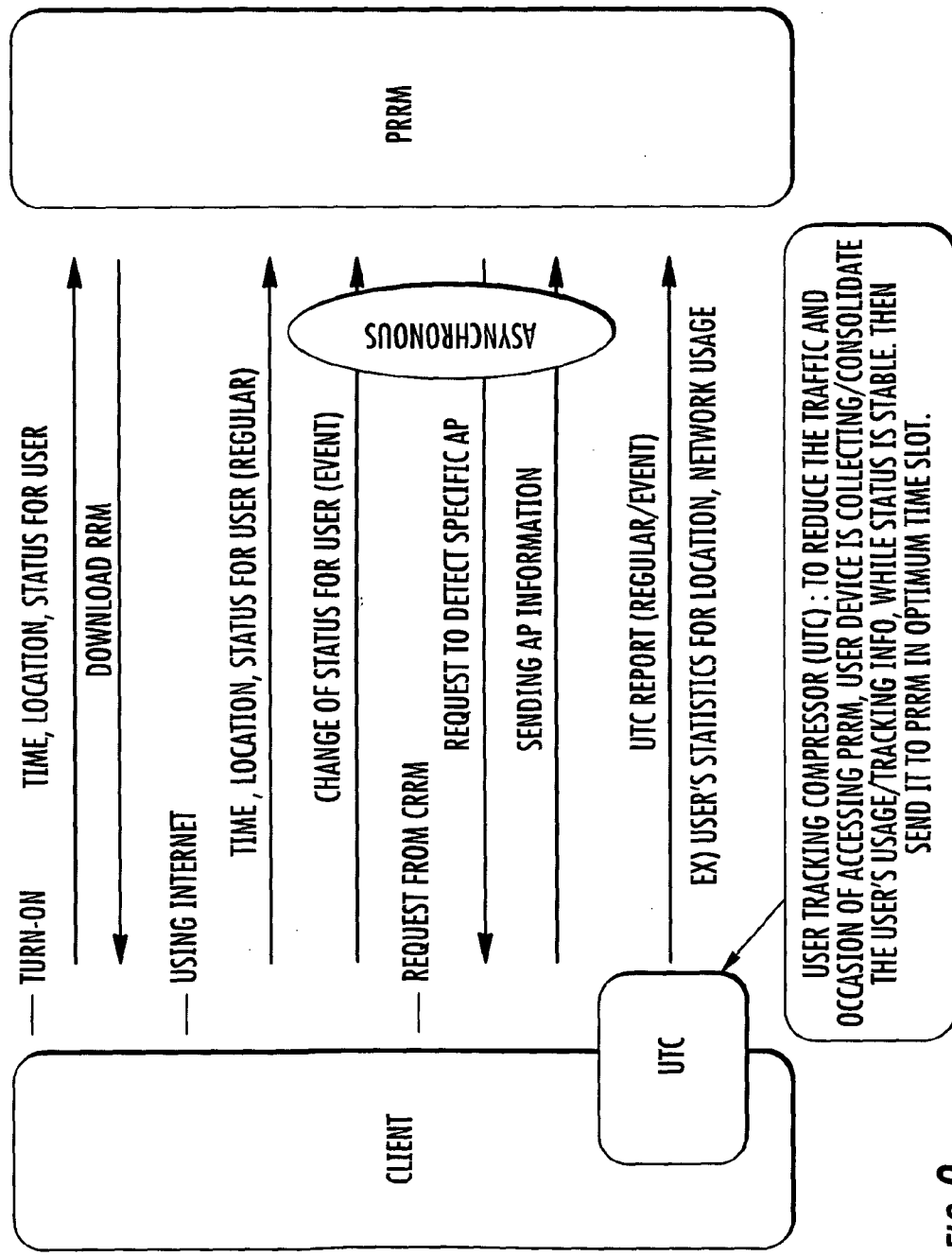
FIG. 9 is a schematic diagram illustrating the sequential flow of information between an individual wireless client device and the PRRM database.

The CRRM maintains a database of wireless resources including location and accessibility requirements. As additionally provided in FIG. 9, the sequential flow of information between the client device and the PRRM network is provided. It should be noted that requests for information from the PRRM to the client device may be regulated in several fashions. One is, a request for update of information can be timed to coincide with periods of low usage of wireless resources. Additionally, when the software on the client user device detects low battery strength or poor signal connection requiring greater battery usage, the client device can override the transmission of information to the PRRM until more optimized conditions of battery life and/or location are obtained.

Figure 10:
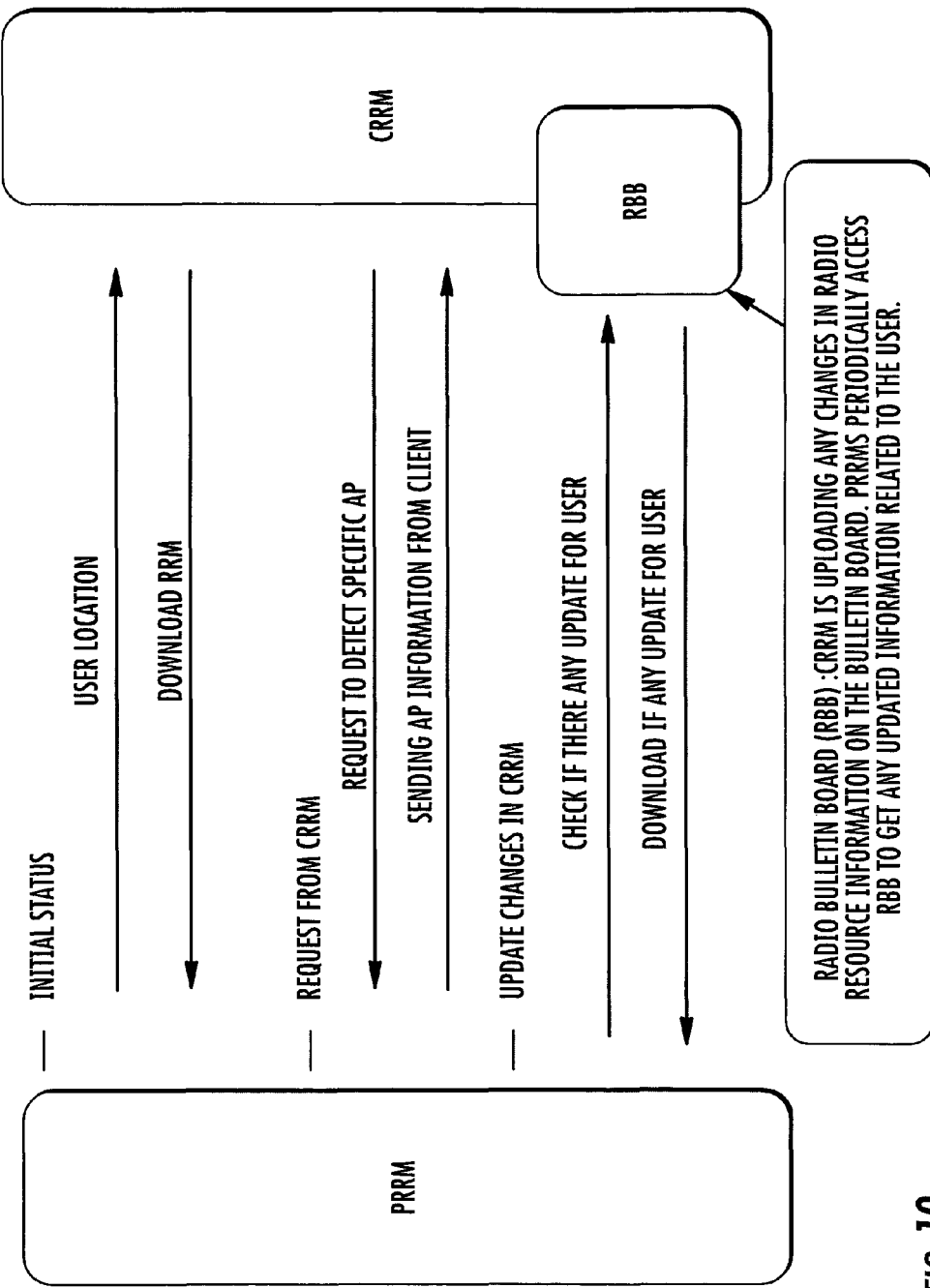
FIG. 10 is a schematic diagram illustrating the progressive flow of information between the PRRM database and the CRRM database.

When a user device is initially detected in a current location, the location is communicated to the PRRM. Initially, the PRRM is established and created when a new user has registered with the CRRM. As the PRRM establishes for a new user device the available APs, the CRRM and PRRM communicate frequently to establish a user specific radio resource map (RRM) for the wireless device. As set forth in FIG. 10, the sequential flow of communication and types of intercommunication between the PRRM network and the CRRM network is set forth.

To safely keep the user privacy, there is no direct connection between UDs and the CRRM. Instead, the PRRM provides indirect communication between them.

1. UD-PRRM Interface (Via Air-Interface)

The UD using any wireless access networks connects to the PRRM located at IP-cloud. To minimize the network affection, the protocols for the UD-RRM interface should be designed to send more information with less signaling messages.

A. Turn-On Procedure

1. First, a UD gets a current location and then, sends a report message about the location with a current time.
2. If the location is known to the PRRM, and there has been no change on the radio resource map (RRM) of the location, the UD starts its normal operation for data communication
3. Otherwise, the UD downloads the updated RRM and then starts its normal operation.

B. UD to PRRM Interaction

A UD regularly should upload a current location and the radio usage status to the PRRM. A UD should download the customized RRM for a user from the PRRM.

A UD should report any changes of network environment to the PRRM.

C. PRRM to UD Interaction

The PRRM, voluntarily or to support the CRRM request, commands the UD to detect signals of nearby APs and reports the result to the PRRM. If the PRRM realizes a UD does not upload his status for a certain time, the PRRM can command the UD to do it.

D. User Tracking Compression (UTC)

A UD collects and suppresses the collected user's usage information into short information, while a user status is stable.

When the UD has to communicate with the PRRM, the UTC message is sent together with the other message. By adopting UTC, the significant amount of data traffic and the number of occasionally contacting the PRRM can be reduced.

2. PRRM-CRRM Interface (Via Back-Haul)

A. Initialization of PRRM

The PRRM is created when a new user has registered in the CRRM. The PRRM has got registered multiple UDs. For the first few weeks, the PRRM leads a location update intensively to build a user specific RRM until the change of the user data is almost vanished.

B. PRRM-CRRM interaction

1. The PRRM downloads the location-based RRM for a user.
2. The CRRM gets the information of APs when the CRRM has no accurate information about them.
3. When a UD finds a new AP or network, the PRRM reports it to the CRRM.
4. The PRRM could communicate with the PRRM for another user.

C. Radio Bulletin Board

The CRRM uploads all changes of radio resource information on a radio bulletin board.

The PRRM must access RBB periodically to get any updated information related to the user, whom the PRRM takes care of.

By this way, the CRRM does not need to broadcast the changes to all the PRRMs.

3. Illegal Spectrum Usage Monitoring by HYNES

The echo system formed by UD-PRRM-CRRM can be used for monitoring the illegal spectrum use such as an excessive transmit power over the limit. This capability is very important especially for UHF white space applications, which uses TV spectrum as a secondary user.

Initially, the PRRM downloads a location based RRM per user from the CRRM. Further, when a wireless device finds a new AP or available network, the PRRM reports it to the CRRM thereby expanding the CRRM database. Once establishing the CRRM database, information provided by a first wireless device may be used to establish a useful RRM for an unrelated, second wireless device. The CRRM maintains the database with all the changes and updates of radio resource information in a radio bulletin board (RBB). Periodically, the PRRM may access the radio bulletin board to get updated information which may affect the client user device. Since the requirements of the PRRM inquiry are directed to a single client device with known zones of access points, the CRRM does not need to distribute all available changes to all PRRMs. Rather, the exchange of information through the RBB is restricted to the applicable changes for the wireless device in question. As part of an integrated process, updates from the user device to the PRRM can subsequently be reported to the CRRM.

An additional characteristic of the identification and mapping of APs addresses the necessity of providing sufficient geographic locations not only of the APs, but also of the wireless device relative to the APs along with establishing usage patterns. While many wireless systems will support GPS capabilities, reliance upon GPS locations promotes excessive energy consumption of the wireless device. Further, GPS technology will not function in indoor environments. As such, mapping locations solely through GPS of wireless hot spots is not always possible.

In coordination with the PRRM and the CRRM databases, there will be an incentive for new APs to provide a physical street address whenever a new AP is installed or expanded. Via the physical address, appropriate coordinates can be mapped placing the new AP in proper location relative to other APs. It is also known that some APs will provide GPS location if the AP has a GPS receiver. Alternatively, the AP can provide a user interface that allows the user to input mapping information manually as part of an initial log in/authentication protocol. As such, mapping information in such circumstances may be relayed to the CRRM through relays from the PRRM.

The PRRM can calculate the location of indoor APs by referencing signal strength as measured and reported by the wireless device. By correlating the signal strength measurement and comparing it to the strength of other AP in close proximity, will provide an approximate location of the new AP location. In addition, the CRRM can calculate the location of an AP by referring to signal strength measurements received by multiple wireless devices over time. In effect, the CRRM can triangulate the location of the AP by making multiple references to signals from multiple wireless devices in various locations. By continuously updating calculations, the CRRM can arrive at a statistically significant, accurate calculation which establishes the geographic location of the AP.

It is also possible to let the wireless device calculate the location by referring to signal strength differences of known multiple APs. Again, through standard triangulation measurements, the geographical location of the wireless device can be detected by referencing relative strength signals. The geographic location of the wireless device via this protocol is useful for wireless devices that do not provide GPS capability or if the CRRM-UD interface establishes that the time and power used for GPS locking is not advisable.

With respect to indoor APZs, the relative AP location can be calculated through an AP socialization process. As an APZ is established and mapped, the distance between APs can be calculated using signal strength differences measured by the wireless device.

Once the PRRM is able to establish an accurate location of one or more APs, the remaining locations of other APs in the APZ can then be calculated.

1. Issues of Location Finding

Most of the APs, which are already deployed indoor, are usually unable to detect GPS signals and so, they are difficult to know their locations accurately. In APZ-cellular switching, the acceptable error range of the AP location can be varied from 10 m to 100 m. However, for AP-AP switching, the acceptable error range needs to be much shorter than the error range of the APZ-cellular switching.

The location of a new AP can be collected if an installer or a user gives the house or building address, when a new AP is installed. Also, a new AP may provide the GPS location to the CRRM if either the AP itself has a GPS receiver or the AP can provide a user interface that a user can input the GPS location manually.

2. Location Finding Algorithm

PRRM can calculate the location of indoor APs by referring to their signal strengths measured and reported by the UD and/or other APs that know their accurate location. Then UD can estimate its location by using fixed AP locations.

A. AP Location Calculation with Multiple UDs' Aids

The CRRM sends a signal strength measurement request to the UD if it is near to a specific AP that its location is inaccurate.

The CRRM can continuously calculate the location of the AP by referring to signal strength measurements sent by many UDs at various times. The CRRM keeps the previous calculation until the CRRM reaches to a conclusion that the most recent calculations show a tiny or no difference.

B. UD Location Calculation with Multiple AP Signals

Without GPS signal, the UD can calculate his location by referring to signal strength difference of multiple APs, which the UD can detect. This scheme is taken if the UD can not catch GPS signals or if the UD thinks that the time and power used for GPS locking is less profitable.

3. Relative Location Finding by "AP Socialization"

With an indoor APZ, the relative AP location can be calculated using AP socialization. A logical plane is defined over logical or geological connections of from all APs to their naps through the AP socialization process. The distance between APs can be calculated using the signal strength difference measured at the UD.

The PRRM assigns the APZ GIS location to the center location of a logical APZ plane. Once the PRRM obtain an accurate location of one or more APs, all locations of other APs in the logical APZ plane can be calculated.

In order for the user device to operate as described above the user device must have appropriate software to allow for the interaction with the PRRM to acquire and transmit necessary data. The key features of the software on the user device enable the following functions:

Enable processes and algorithms to allow at least one of GPS location or non-GPS triangulation positioning based on proximity to APs.

Select and change wireless interface based upon criteria including location, signal strength, available connection, bandwidth demand, transmission content, speed/movement of user device, and communication protocols with PRRM;

The software will detect and store users behavior, available APs, AP Zones and transmit information to PRRM;

Receive requests from PRRM and respond with requested data exchange;

Monitors battery status of user device to prioritize battery life; allows user device to disregard or delay processes functions which require higher battery demand when low battery strength is detected.

Have motion sensing capabilities by either GPS or triangulation ability to disengage wi-fi capabilities when rapid movement is detected;

Switching algorithms to allow seamless transition from one AP zone to another AP zone.

The above described capabilities as well as the features and functions described in this specification are all capable of being handled through appropriate software and algorithms containing such software. Such software capabilities and algorithms are well within the ability of one having ordinary skill in the art to implement.

Additional details of the invention and capabilities are provided in the 51 page Appendix 1 which was included in the related provisional patent application referenced above, and in Appendix 2 of 8 pages also referenced and accompanied the related provisional patent application. The Appendix 1 (51 pages) and Appendix 2 (8 pages) provided in the related provisional application referenced above are each incorporated herein by reference.

Although preferred embodiments of the invention have been described using specific terms, devices, and methods, such description is for illustrative purposes only. The words used are words of description rather than of limitation. It is to be understood that changes and variations may be made by those of ordinary skill in the art without departing from the spirit or the scope of the present invention which is set forth in the following claims. In addition, it should be understood that aspects of the various embodiments may be interchanged, both in whole, or in part. Therefore, the spirit and scope of the appended claims should not be limited to the description of the preferred versions contained therein.

That which is claimed:

1. Providing a user device selected from a group consisting of a cellular telephone, a wireless handheld device, and a laptop computer;
   establishing a database of geographic locations of said user device, said geographic location further including identifying available wireless resources available to said wireless device;
   establishing a behavioral pattern of said user device based upon at least one of a geographic location, a direction of travel, time of day, or bandwidth demand of said user device;
   using said collected information to predict user device needs to provide a default wireless connection of said user device at a given geographical location to maximize wireless resources and minimize cost of use of said user device; and,
   detecting transmitted data characteristics of said data being transmitted to or from said user device and altering said wireless connection resource based upon the characteristics of the data being transmitted.

2. Creating a database of wireless communication access points comprising the steps of:
   detecting a known wireless device geographic location from at least one of a GPS detector, a public wi-fi connection, a cellular telephone connection, or a proprietary wi-fi connection;
   recognizing a pattern of usage of said known wireless device based upon a repeated pattern observed in establishing said database;
   selecting for said known wireless device while within a given geographic location the most cost effective wireless communication protocol; and,
   monitoring said wireless communication content for at least one of bandwidth usage or proprietary transmission and seamlessly connecting said known wireless device to an alternative wireless connection mode in view of said transmission characteristics.

3. The process of creating said database according to claim 2 comprising the additional step of:
   detecting movement of said known wireless device from one geographic location to another;
   predicting, based upon said pattern of usage, a predicted path of said wireless device;
   seamlessly transferring said wireless device from one connection source to a second connection source based upon an evaluation of first a geographic location of said wireless device and secondly an analysis of at least one of a bandwidth usage and a wireless content of information being transmitted or received by said known wireless device, said step further including selecting the most cost efficient communication protocol available for said known wireless device based on sent bandwidth usage and sent information content.

4. A process of selecting a wireless communication choice for a wireless device comprising the steps of:
   identifying the wireless device;
   establishing a geographic location for said wireless device;
   detecting a desired access point for said wireless device at a given location;
   connecting said wireless device to said access point;
   monitoring a content of a wireless transmission between said access point and said wireless device and changing said access point based upon a content of said wireless transmission; and,
   periodically monitoring conditions of a geographic location, available access points, and wireless transmission content between said access point and said wireless device to vary said selected access point to provide an optimal connection.

5. The process of according to claim 4 wherein said optimal connection is determined by an analysis of at least one of a transmission content between a wireless device and said access point and bandwidth usage of said transmission between said wireless device and said access point.

* * * * *